United States Patent [19]
Korhonen

[11] Patent Number: 6,121,549
[45] Date of Patent: Sep. 19, 2000

[54] HOLDER FOR MOUNTING A PLATE WITHIN AN ENCLOSURE FOR ELECTRIC INSTALLATIONS

[75] Inventor: Olli Korhonen, Espoo, Finland

[73] Assignee: Fibox Oy AB, Jorvas, Finland

[21] Appl. No.: 09/056,065

[22] Filed: Apr. 6, 1998

[30] Foreign Application Priority Data

Apr. 7, 1997 [FI] Finland .................................... 971443

[51] Int. Cl.[7] .................................................... H02G 3/14
[52] U.S. Cl. .............................. 174/66; 174/50; 220/3.8; 220/241
[58] Field of Search ................................ 174/66, 67, 50, 174/1; 220/3.8, 241, 242

[56] References Cited

U.S. PATENT DOCUMENTS

| | | | |
|---|---|---|---|
| 2,880,264 | 3/1959 | Ruskin | 174/67 |
| 3,200,989 | 8/1965 | Hubbell | 220/242 |
| 3,252,611 | 5/1966 | Weitzman et al. | 220/242 |
| 3,811,004 | 5/1974 | Moore | 174/67 |
| 4,058,358 | 11/1977 | Carlisle | 220/242 X |
| 4,908,733 | 3/1990 | Zachrei et al. . | |
| 5,731,544 | 3/1998 | Burck et al. | 174/66 |
| 5,773,760 | 6/1998 | Stark et al. | 174/66 |
| 5,929,379 | 7/1999 | Reiner et al. | 174/66 |
| 5,955,702 | 9/1999 | Grossman et al. | 174/66 |

FOREIGN PATENT DOCUMENTS

| | | |
|---|---|---|
| 0 496 458 | 7/1992 | European Pat. Off. . |
| 40 33 109 | 4/1992 | Germany . |

*Primary Examiner*—Dean A. Reichard
*Attorney, Agent, or Firm*—Altera Law Group, LLC

[57] ABSTRACT

The invention relates to a holder for mounting a plate, such as a front plate, a contact protective plate or a circuit card, within an enclosure for electric installations, which enclosure comprises a bottom part and which holder is constituted by an elongated member comprising a body part and having at least at one end a hole for fastening the holder to the bottom part, wherein at least one end of the holder comprises an expanding wedge part arranged to expand against the bottom part, when a fastening means is mounted in a hole at the end of the holder, whereby a support surface is attached to the wedge part, the support surface being intended to press the wall of the bottom part for fastening the holder by friction joint within the enclosure at a desired height from the bottom of the bottom part. To have a holder with a simple construction, which can be mounted steplessly at a desired height from the bottom of the bottom part very easily and rapidly, the wedge part is arranged to be displaced in a direction increasing the length of the holder and there is a slit between the wedge part and the body part of the holder for causing a material weakening in the holder, which weakening provides the combination of the body part and the wedge part with flexibility, making said displacement of the wedge part possible.

6 Claims, 2 Drawing Sheets

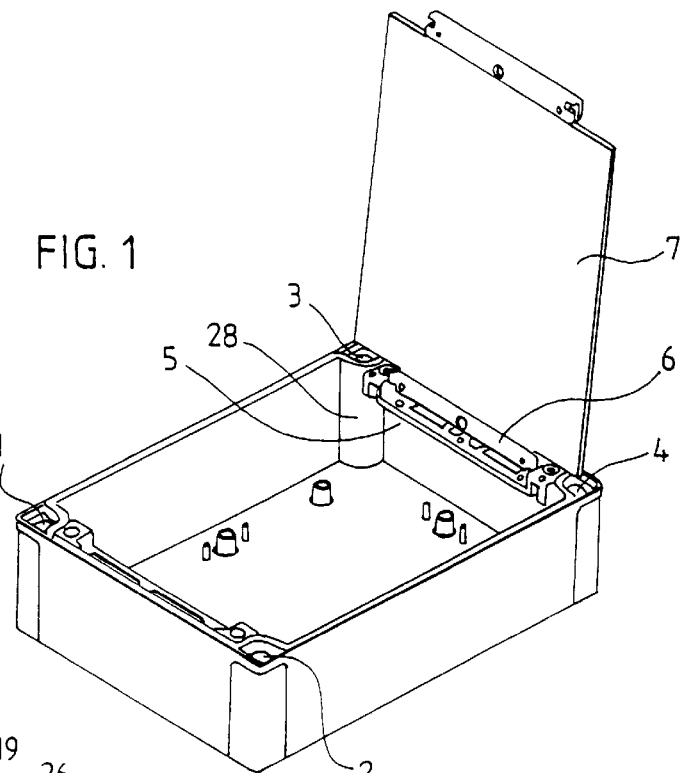
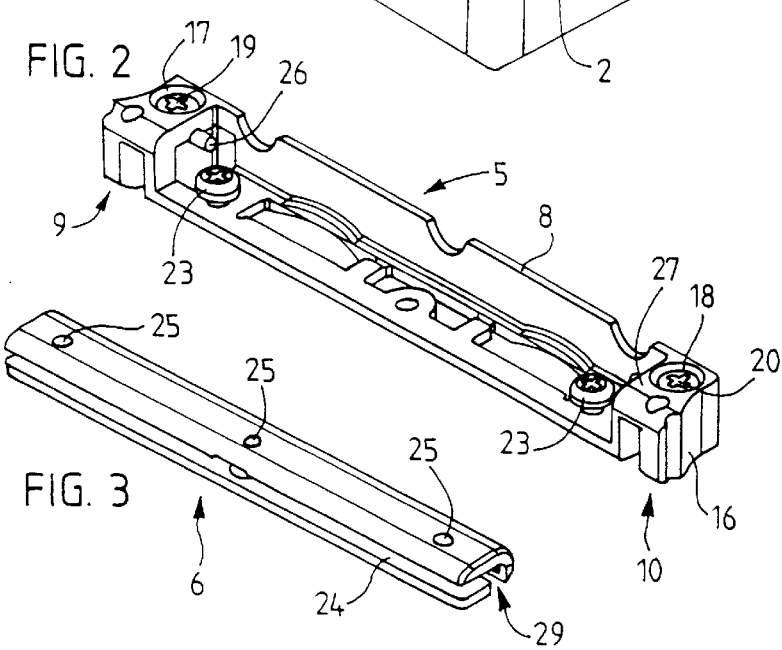
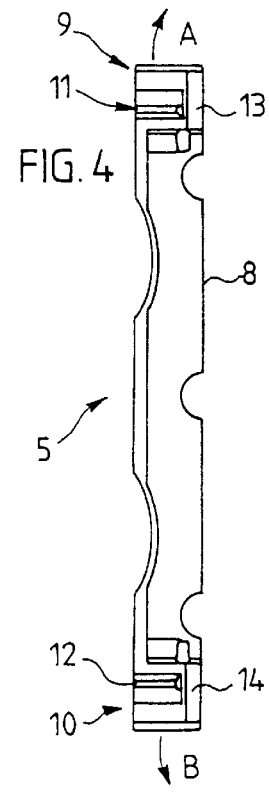

HOLDER FOR MOUNTING A PLATE WITHIN AN ENCLOSURE FOR ELECTRIC INSTALLATIONS

BACKGROUND OF THE INVENTION

The invention relates to a holder for mounting a plate, such as a front plate, a contact protective plate or a circuit card, within an enclosure for electric installations, which enclosure comprises a bottom part and which holder is constituted by an elongated member comprising a body part and having at least at one end a hole for fastening the holder to the bottom part, wherein at least one end of the holder comprises an expanding wedge part arranged to expand against the bottom part, when a fastening means is mounted in a hole at the end of the holder, whereby a support surface is attached to the wedge part, the support surface being intended to press the wall of the bottom part for fastening the holder by friction joint within the enclosure at a desired height from the bottom of the bottom part.

Many kinds of holders are known for mounting plates in enclosures for electric installations. Depending on the application, the plates have to be mounted at different heights of the enclosure, which means that the distance between the plate and the bottom of the enclosure varies subject to the enclosure in question and its content. Known holders are fastened at the right height from the bottom of the enclosure by using spacing or elevation pieces of different lengths. Elevation pieces are typically sleeve-like pieces, which are screwed into the bottom of the enclosure, whereby a plate to be fastened is screwed to the upper end of the sleeves. Mounting elevation pieces takes time. Each plate requires four elevation pieces. Normally, eight screws in total are used for fastening a plate.

If changes are made in the content of the enclosure later, a need to change the height position of the plate in the enclosure may easily arise. A choice has to be made then from a great number of elevation pieces. It is naturally inconvenient to use elevation pieces of several different sizes for mounting. In addition, several different elevation pieces are inconvenient for the manufacture and storage as well.

In order to overcome said problems, height-adjustable holders have been disclosed in EP-A1-0 496 458, DE 40 33 109 A1 and U.S. Pat. No. 4,908,733. These holders are, however, fairly complicated in their construction and they require the walls of the bottom part to be provided with fastening means for the holders.

BRIEF DESCRIPTION OF THE INVENTION

The object of the present invention is to eliminate said drawbacks. To implement this, the present invention provides for a holder for mounting a plate, such as a front plate, a contact protective plate or a circuit card, within an enclosure for electric installations, which enclosure comprises a bottom part and which holder is constituted by an elongated member comprising a body part and having at least at one end a hole for fastening the holder to the bottom part, wherein at least one end of the holder comprises an expanding wedge part arranged to expand against the bottom part, when a fastening means is mounted in a hole at the end of the holder, whereby a support surface is attached to the wedge part, the support surface being intended to press the wall of the bottom part for fastening the holder by friction joint within the enclosure at a desired height from the bottom of the bottom part, wherein the wedge part is arranged to be displaced in a direction increasing the length of the holder and there is a slit between the wedge part and the body part of the holder for causing a material weakening in the holder, which weakening provides the combination of the body part and the wedge part with flexibility, making said displacement of the wedge part possible. Such a holder is easily-manufactured. It can be manufactured of plastic in one piece.

The other preferred embodiments of the invention are presented in the attached claims 2 to 6.

The advantages of the holder according to the invention consist in the fact that it has a simple construction and it can be mounted steplessly at a desired height from the bottom of the bottom part very easily and rapidly. The use of elevation pieces can also be given up. Depending on the embodiment of the invention, the holder can be fastened with one or two screws or with a similar fastening means. A possible later lifting or lowering of the holder succeeds by loosening the screw and by tightening it again when the right place has been found, which steps are extremely easy. Fastening the holder of the invention to the bottom part of an enclosure does not take up any space at all from the bottom of the bottom part, and so this area can be used freely for mounting other components.

BRIEF DESCRIPTION OF THE FIGURES

The invention will be described in the following in greater detail by means of one preferred embodiment with reference to the attached drawing, where FIG. 1 shows a holder according to the invention mounted within an enclosure;

FIGS. 2, 4 to 6, show the holder of FIG. 1 in different angles of view;

FIG. 3 shows a hinge part to be fastened to the holder; and

DETAILED DESCRIPTION OF THE INVENTION

Figure 6:
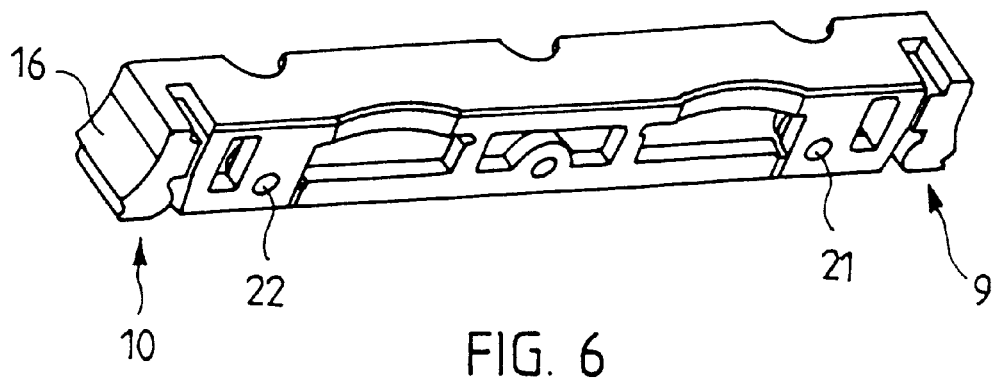
Figure 7:
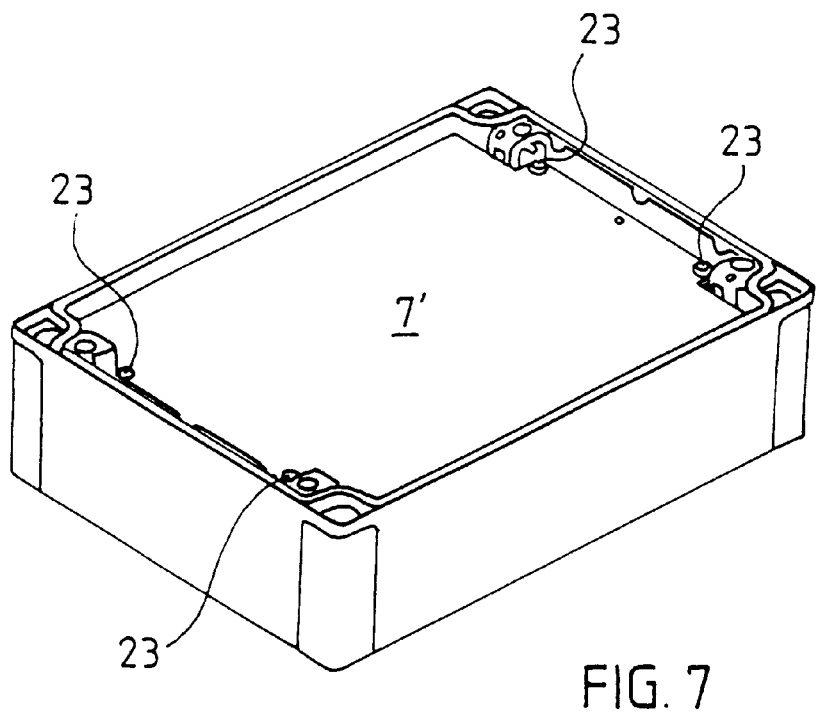
FIG. 7 shows another manner of using the holder of FIGS. 2, 4 to 6, than FIG. 1 does.

FIG. 1 shows a bottom part of an enclosure for electric installations. A cover to the enclosure is not shown. The enclosure is of a type which comprises corner turrets 1 to 4, one in each corner.

By means of screws (see FIGS. 2 and 5), an elongated holder is mounted in the bottom part, the holder being generally indicated by reference numeral 5. In FIG. 1, the holder 5 is arranged to be supported on the upper part of the corner turrets 3 and 4. A front plate 7 is fastened to the holder 5 through a hinge part 6.

In FIGS. 2, 4 to 6, the holder 5 is shown more accurately. The holder 5 comprises an elongated body part 8 having wedge parts 9 and 10 at its both ends. From FIG. 4 is seen that there are slots or slits 11, 12 between the wedge parts 9, 10 and the ends of the body part 8. The slits 11, 12 provide the holder 5 with material weakenings 13 and 14, which make it possible for the wedge parts 9, 10 to be displaced or to yield, i.e. to move away from the body part 8 making the holder longer. Arrows A and B show the direction in which the wedge parts 9, 10 move.

From FIGS. 2, 5 and 6 appears that the wedge parts comprise support surfaces 15, 16 having a design corresponding to the design of the corner turrets 3, 4. The support surfaces 15, 16 are thus curved, like surfaces 28 bearing against the wedge parts of the corner turrets. The support surfaces 15, 16 have, as can be understood, a rather big size providing for a very secure and tight locking against the surfaces 28.

There are holes 17, 18 for screws 19, 20 at each end of the holder 5. When the screws 19, 20 are screwed into the holes 17, 18, the wedge parts 9, 10 move, i.e. flex or yield, in the direction of the arrows A and B of FIG. 4, which makes the slits 11, 12 of FIG. 4 somewhat bigger.

When the holder 5 is fastened to the bottom part of the enclosure, the holder is at first mounted at a desired height of the corner turrets 3, 4, and then the screws 19, 20 (see FIG. 2) are tightened, which makes the wedge parts 9,10 spread in the lateral direction and press the support surfaces 15, 16 against the curved surfaces 28 of the corner turrets. The holder can thus be fastened by friction surfaces constituted by the support surfaces 15, 16 to the corner turrets 3, 4. The fastening is very firm.

From the figures, e.g. FIG. 6, is seen that the holder comprises, besides said holes 17, 18, two other fastening holes 21, 22 made at the ends of the body part 8. These fastening holes 21, 22 are intended for fastening a front plate 7' fixedly by screws 34 directly to the holder 5, without using a hinge part 6 according to FIG. 3.

A hinge part 6 according to FIG. 3 makes it possible to turn the plate 7 when the holder 5 is in place, see FIG. 1. The hinge part 6 comprises a slot 24 for receiving a plate 7 and 1 to 3 holes 25 for fastening the plate with screws to the hinge part. In order that the hinge part may turn with respect to the holder 5, the holder comprises hinge pins 26, 27. The hinge part 6 comprises grooves 29 for receiving the hinge pins 26, 27.

The holder 5 is preferably made of plastic integrally with the wedge parts. The length of the holder is chosen to be compatible with the inner dimensions of the enclosure, naturally.

The invention has been described above by means of only one embodiment and it is pointed out therefore that the invention may be implemented in many ways within the scope of the attached claims. It is thus, for instance, conceivable that the wedge part is provided only at one end of the holder, because a lengthening of the holder is possible also by a solution of this kind and the holder can be locked to the bottom part of the enclosure by friction joint. An advantage of such a solution is that the holder can be fastened to the enclosure extremely rapidly by using one screw only. It is also conceivable that the holder is arranged to be fastened to the inner wall of the enclosure such that it is fastened to the inner walls and not to a corner turret.

I claim:

1. Holder for mounting a plate within an enclosure for electric installations, which enclosure comprises a bottom part and which holder comprises:

an elongated member comprising a body part having at least at one end a hole for fastening the holder to the bottom part, wherein at least one end of the holder comprises an expanding wedge part arranged to expand against the bottom part when a fastener is mounted in the hole at the at least one end of the holder, whereby a support surface is attached to the wedge part for pressing the wall of the bottom part for fastening the holder by friction joint within the enclosure at a desired height from the bottom of the bottom part, the wedge part being arranged to be displaced in a direction increasing the length of the holders a slit between the wedge part and the body part of the holder causing a material weakening in the holder, which weakening provides the combination of the body part and the wedge part with flexibility to permit said displacement of the wedge part.

2. Holder according to claim 1, wherein the elongated member has a hole at each end for fastening the holder to the bottom part, wherein each end of the holder comprises a wedge part.

3. Holder according to claim 1, wherein the fastening means is a screw.

4. Holder according to claim 1, wherein the holder is manufactured of plastic integrally with the wedge part.

5. Holder according to claim 1 for an enclosure provided with corner turrets, wherein the support surface of the wedge part is curved so that the support surface is supported against a curved surface of a corner turret.

6. Holder according to claim 1, wherein the holder additionally comprises fastening holes at each end of the body part for fastening the plate to the holder.

* * * * *